US012756472B2

(12) United States Patent
Jung et al.

(10) Patent No.: US 12,756,472 B2
(45) Date of Patent: Oct. 6, 2026

(54) DETACHABLE LIGHT SOURCE SUPPLY APPARATUS AND OPTICAL TRANSCEIVER HAVING THE SAME

(71) Applicant: ELECTRONICS AND TELECOMMUNICATIONS RESEARCH INSTITUTE, Daejeon (KR)

(72) Inventors: Soo Yong Jung, Daejeon (KR); Jong Jin Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 248 days.

(21) Appl. No.: 18/379,008

(22) Filed: Oct. 11, 2023

(65) Prior Publication Data

US 2024/0129035 A1 Apr. 18, 2024

(30) Foreign Application Priority Data

Oct. 14, 2022 (KR) ........................ 10-2022-0131976
Sep. 27, 2023 (KR) ........................ 10-2023-0129969

(51) Int. Cl.
*H04B 10/00* (2013.01)
*H04B 10/40* (2013.01)
(Continued)

(52) U.S. Cl.
CPC ........... *H04B 10/40* (2013.01); *G02B 6/3807* (2013.01)

(58) Field of Classification Search
CPC ........ H04B 10/40; G02B 6/42; G02B 6/4292; G02B 6/4204; G02B 6/4206;
(Continued)

(56) References Cited

U.S. PATENT DOCUMENTS 9,110,260 B2 8/2015 Lee et al.
9,146,365 B1 9/2015 Oki et al.
(Continued)

FOREIGN PATENT DOCUMENTS

JP 2005-78036 A 3/2005
JP 2012-42870 A 3/2012
(Continued)

*Primary Examiner* — Daniel G Dobson
(74) *Attorney, Agent, or Firm* — LRK PATENT LAW FIRM

(57) ABSTRACT

Provided is a detachable light source supply apparatus in which a light source element, which has a high probability of failure among components of an optical transceiver, is separately disposed on the outside, to supply a light source to the optical transceiver. This detachable light source supply apparatus includes a detachable coupling part to the optical transceiver, and an optical input/output unit. The detachable coupling part and the optical input/output unit may be implemented with MPO type connectors. Depending on various wavelength standards, an external light source element may be a multi-channel light source element that emits light sources having different wavelengths. For the multi-channel light source element, a plurality of light emitter of a single wavelength may be used, and in other embodiments, a multi-channel light emitter that emits light sources having a plurality of different wavelengths may be used.

10 Claims, 8 Drawing Sheets

(51) Int. Cl.
*G02B 6/38* (2006.01)
*H04J 14/00* (2006.01)

(58) Field of Classification Search
CPC .. G02B 6/4212; G02B 6/4215; G02B 6/4246; G02B 6/425; G02B 6/426; G02B 6/4261
See application file for complete search history.

(56) References Cited

U.S. PATENT DOCUMENTS

| | | | | |
|---|---|---|---|---|
| 2008/0285978 | A1 | 11/2008 | Choi et al. | |
| 2018/0156973 | A1 | 6/2018 | Welch et al. | |
| 2020/0386941 | A1 * | 12/2020 | Kang | G02B 6/4246 |

FOREIGN PATENT DOCUMENTS

| | | | |
|---|---|---|---|
| KR | 10-1045902 | B1 | 7/2011 |
| KR | 10-2012-0102410 | A | 9/2012 |
| KR | 10-2023-0045515 | A | 4/2023 |

* cited by examiner

DETACHABLE LIGHT SOURCE SUPPLY APPARATUS AND OPTICAL TRANSCEIVER HAVING THE SAME

CROSS-REFERENCE TO RELATED APPLICATIONS

This application claims priority to and the benefit of Korean Patent Applications No. 10-2022-0131976 filed on Oct. 14, 2022 and No. 10-2023-0129969 filed on Sep. 27, 2023, the disclosures of which are incorporated herein by reference in their entirety.

BACKGROUND

1. Field of the Invention

The present disclosure relates to a detachable light source supply apparatus that may be attached and detached to flexibly respond to events in a high-capacity transmission network environment such as failure, upgrading, or management by separating a light source element, which is one of the core components of an optical transceiver used in a high-speed optical communication network, to a separate module or element. The present disclosure also relates to an optical transceiver including the detachable light source supply apparatus.

2. Description of Related Art

In recent years, data traffic has been increasing exponentially due to vitalization of service industries based on hyper-connected intelligent infrastructures such as a fifth generation (5G) networks and artificial intelligence (AI), and as services in which cloud-based computing capabilities are important become more active, advancement of data center network equipment of cloud service providers is accelerating. Among main components of data center network equipment, optical transceivers are components that connect an optical network that is a line side and a system that is a host side and serve to convert optical signals received from the optical network that is the line side into electrical signals that may be processed by the system that is the host side or convert the electrical signals processed by the host side into optical signals to transmit the converted signals to the line side. The optical transceivers are core components that determine a transmission speed of data centers together with processors and switches and have a very large technological ripple effect. As data traffic increases, a replacement cycle of data center network equipment is shortened to less than five years. Accordingly, demand for components of the optical transceivers is required from 100 GB-grade products in 2016 to 400 GB-grade products in 2021, and demand for 800 GB-grade products is expected to grow from 2025.

As illustrated in FIGS. 1 and 2, an internal structure of the optical transceiver includes a light source element 2 that transmits an optical signal converted from an electrical signal through a single-mode optical fiber 9, a light source driving element 3 that drives the light source element 2, a light receiving element 4 that converts the optical signal received through a single-mode optical fiber 9 into the electrical signal, a light signal amplifying element 5 that converts the electrical signal (current) output from the light receiving element 4 into a voltage signal and amplifies the voltage signal, and a signal processing element 6 that performs a function (clock data recovery (CDR) function) of matching timings of multi-channel signals or a function (gearbox function) of matching a signal interface of the host side and the line side. According to an optical signal input/output method, the optical transceivers may be classified according to a multi-channel input/output method having a multi-fiber push-on (MPO) connector 7 as in FIG. 1 and a single-channel input/output method using a lucent connector (LC) 7' as in FIG. 2. When the latter single-channel input/output method is applied, a wavelength division multiplexing (WDM) multiplexer MUX 8 and a demultiplexer WDM demultiplexer DeMUX 8' are additionally required for an internal optical transmitter and an internal optical receiver, respectively.

In recent years, in order to increase the capacity of transmission and reception data of an optical transceiver, a transmission capacity has been expanded through highly integrated multi-channelization in which a transmission speed per channel increases and at the same time a plurality of channels are arranged inside one optical transceiver. In the case of a 100 GB grade optical transceiver, four channels with a 25 Gbps signal per unit channel are configured, and thus a transmission capacity is expanded to 100 Gbps. In the case of a 400 GB grade optical transceiver, eight of a transmission speed of 50 Gbps per channel are multiplexed or a transmission speed per unit channel is increased to 100 Gbps and four of a transmission speed of 100 Gbps per unit channel are multiplexed. Further, in the case of an 800 GB grade optical transceiver, considering current technology trends, eight channels of 100 Gbps signals or four channels of 200 Gbps signals are expected to be configured. In the future, a 1.6 Tbps optical transceiver is expected to multiplex 16 of a 100 Gbps, multiplex 8 of 200 Gbps into eight channels, or multiplex 4 of 400 Gbps.

In order to increase a transmission capacity of the optical transceiver as an optical signal transmission bandwidth increases, a high bandwidth, lower power consumption, and a small size should be simultaneously satisfied, and to achieve this, a co-packaged optics (CPO) technology is emerging. CPO is a technology of heterogeneously integrating, on a single board, an optical element (including a light source, a photodetector, and an optical circuit chip) and an electronic element (a digital signal processor (DSP), an application specific integrated circuit (ASIC) or the like) and may reduce power consumption and heat by keeping a length of a radio frequency (RF) wiring line short and reducing use of unnecessary electronic elements.

According to data related to an optical-electrical interface of CPO optical modules recently announced at the Optical Internetworking Forum (OIF), a method of supplying a light source by using a light source element which has a relatively high probability of failure compared to other elements has been proposed in order to improve the reliability of the CPO. The proposed light source element is disposed separately from other elements that were previously arranged together, such as a light source driving element, etc.

SUMMARY OF THE INVENTION

The present disclosure is directed to providing a detachable light source supply apparatus in which, among components of an optical transceiver, a light source element is separately disposed on the outside to supply a light source to the optical transceiver, and an optical transceiver including the same.

A detachable light source supply apparatus in which a light source element, which has a high probability of failure, among components of an optical transceiver, is separately disposed on the outside, to supply a light source to the optical transceiver may be provided. This detachable light source supply apparatus may include a detachable coupling part to the optical transceiver, and an optical input/output unit. The detachable coupling part and the optical input/output unit may be implemented with MPO type connectors. Depending on various wavelength standards, an external light source element may be a multi-channel light source element that emits light sources having different wavelengths. For the multi-channel light source element, light source elements of a single wavelength may be used, and in other embodiments, a multi-channel light source element that emits light sources having a plurality of different wavelengths may be used.

According to the optical transceiver to which the detachable light source supply apparatus of the present disclosure is applied, an external light modulator that modulates a light source supplied from the outside may be used instead of the light source element used in the existing optical transceiver structure. The light source supplied from the detachable light source supply apparatus may be transmitted to an optical transceiver body via the MPO and may be input as an input signal of the external light modulator. The external light modulator may output a modulated optical signal obtained by loading data on the input light source through a signal processing element and a driving element, and the output data-modulated optical signal may be transmitted to the outside through the MPO via the detachable light source supply apparatus again. The external light signal received by the optical transceiver may pass through the detachable light source supply apparatus and may be received and processed by a light receiving element and the signal processing element of the optical transceiver body.

The problem to be solved described above will become clearer through embodiments described below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. Terms used in the following description are intended to describe the embodiments of the present disclosure and are not intended to limit the present disclosure. In the present specification, a singular form also includes a plural form unless specifically mentioned. The term "comprise" or "comprising" used herein does not exclude the presence or addition of one or more other components, steps, operations, and/or elements in addition to components, steps, operations, and/or elements that are described.

Figure 3:
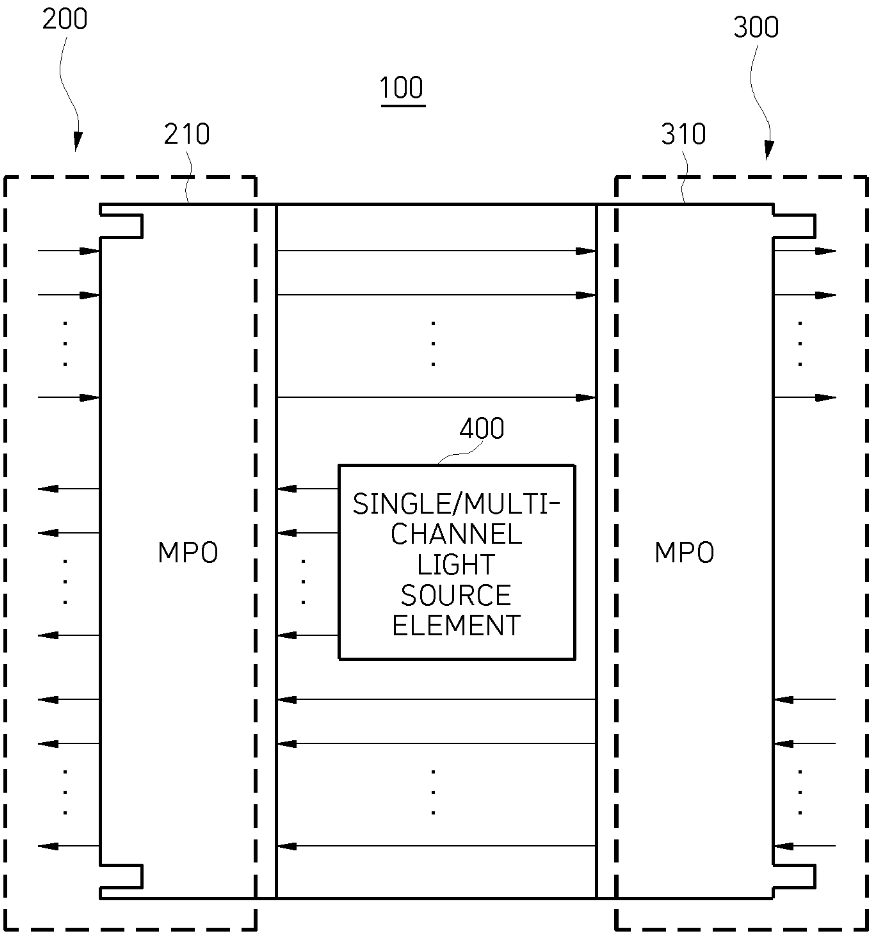
FIG. 3 is a diagram of a detachable light source supply apparatus according to an embodiment of the present disclosure.

FIG. 3 illustrates a detachable light source supply apparatus 100 according to an embodiment, which is detachably attached to the outside of an optical transceiver and supplies a single-channel or multi-channel light source to the optical transceiver. This light source supply apparatus includes an optical transceiver coupling part 200 that is detachably attached to an optical transceiver body 10 and an optical input/output unit 300 that receives or transmits a light source from or to an optical network. The optical transceiver coupling part 200 is coupled to the optical transceiver body 10 using an MPO 210, and an optical fiber (not illustrated) is connected to the optical input/output unit 300 through an MPO 310. Further, a single- or multi-channel light source element 400 supplies a light source to the optical transceiver body 10 (see FIG. 5) through the optical transceiver coupling part 200.

Figure 4A:
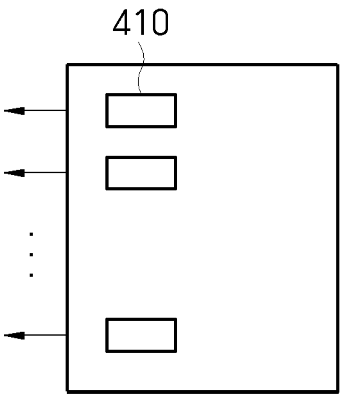
FIG. 4A is a conceptual diagram of multi-channel light source supply through use of a plurality of light emitters.
Figure 4B:
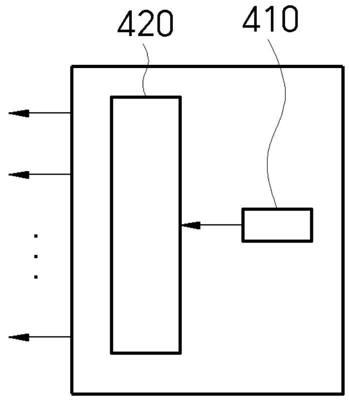
FIG. 4B is a conceptual diagram of multi-channel light source supply through use of a single light emitter and an optical splitter.
Figure 4C:
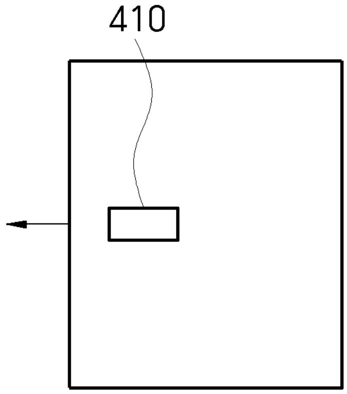
FIG. 4C is a conceptual diagram of single-channel light source supply through use of a single light emitter.

The detachable light source supply apparatus 100 may perform multi-channel light source supply or single-channel light source supply according to various wavelength standards such as local area network wavelength division multiplexing (LWDM), dense wavelength division multiplexing (DWDM), coarse wavelength division multiplexing (CWDM), metro wavelength division multiplexing (MWDM), etc. To implement the multi-channel light source supply, for example, a plurality of light emitters 410 may be arranged (see FIG. 4A), one light emitter 410 and an optical splitter 430 may be used (see FIG. 4B), or in addition, a multi-channel light emitter that emits light sources having a plurality of different wavelengths may be used. To implement the single-channel light source supply, the one light emitter 410 may be used (see FIG. 4C).

Figure 5:
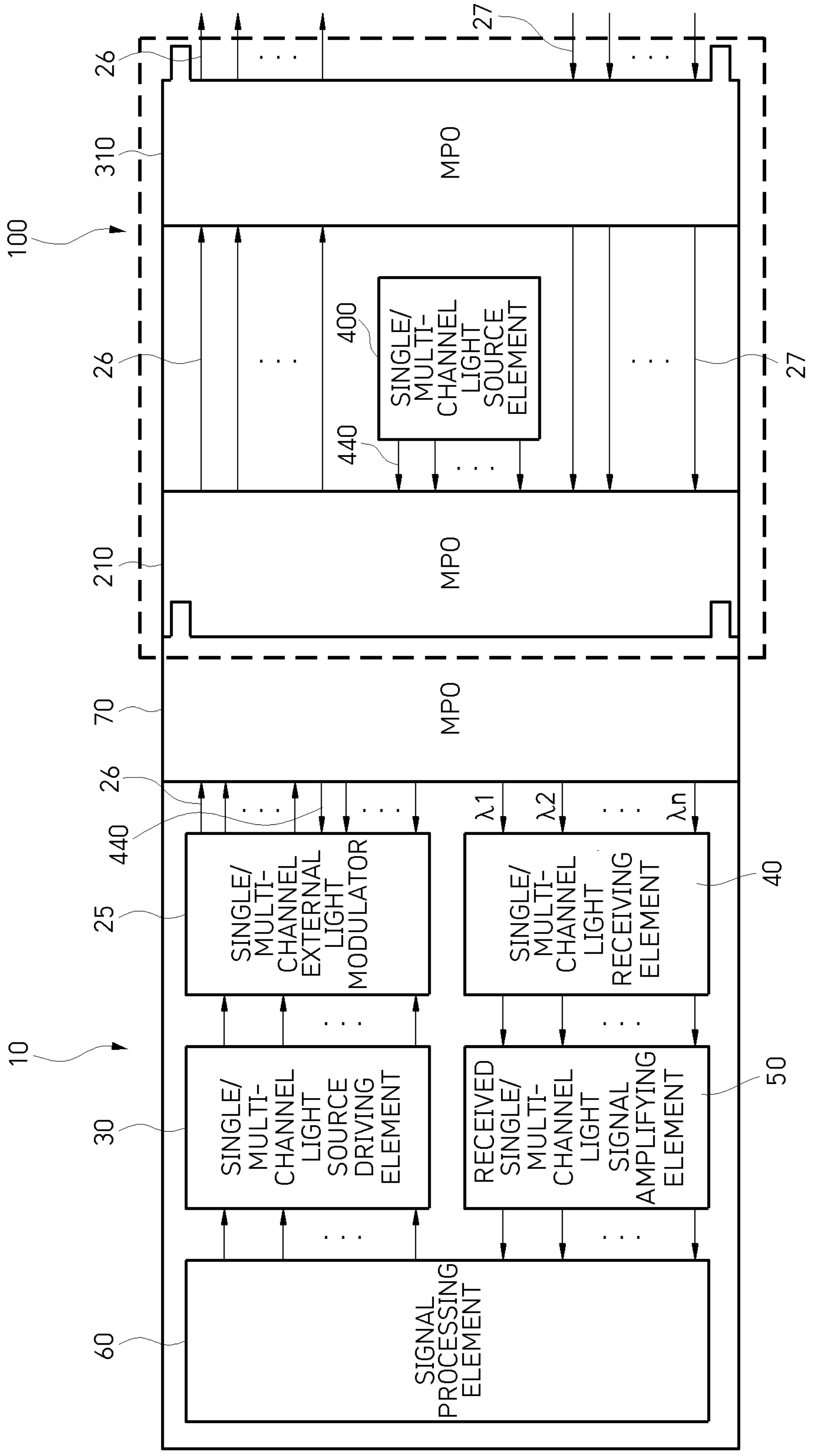
FIG. 5 is a diagram of an optical transceiver to which the detachable light source supply apparatus is applied.

The optical transceiver body 10 to which the detachable light source supply apparatus 100 is applied may be configured as illustrated in FIG. 5.

Figure 1:
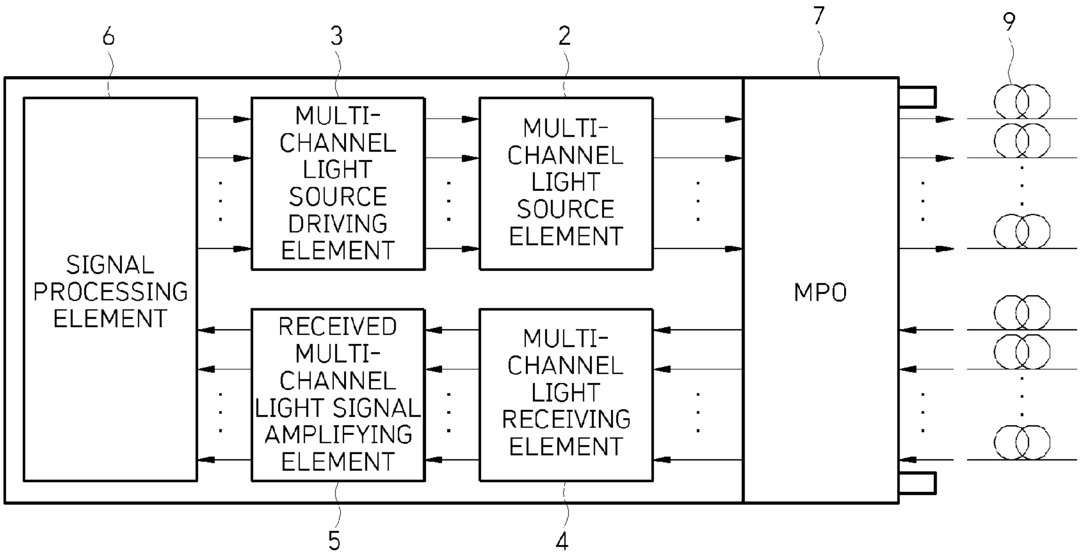
FIG. 1 is a diagram of an optical transceiver of a parallel arrangement manner, which is provided with a multi-channel input/output terminal MPO.
Figure 2:
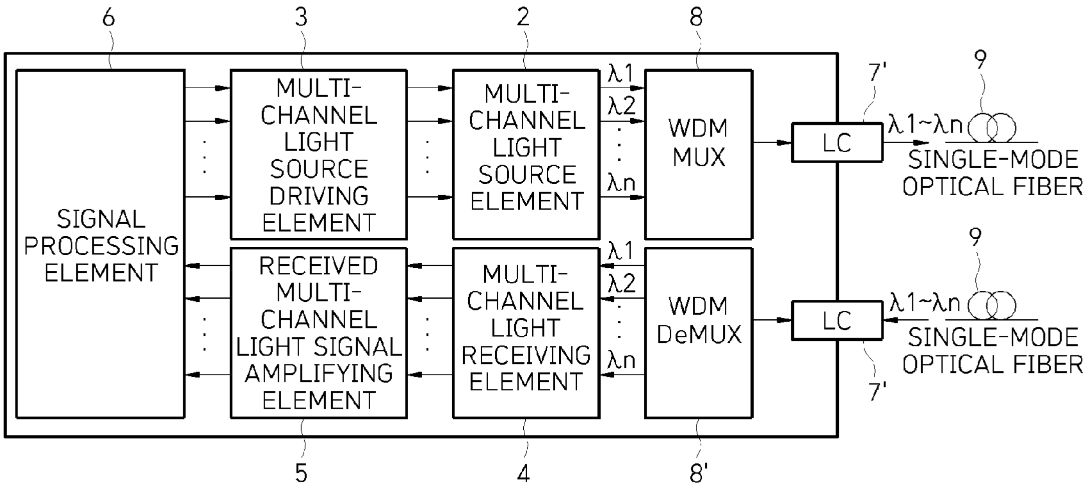
FIG. 2 is a diagram of an optical transceiver of an optical wavelength multiplexing/demultiplexing manner, which is provided with a single-channel input/output terminal LC.

The optical transceiver uses an external light modulator 25 instead of a light source element of an existing optical transceiver structure (see FIGS. 1 and 2), and is formed with the light source supply apparatus 100 separately attached to transmit or receive a signal. A light source 440 emitted from the light source element 400 included in the detachable light source supply apparatus 100 is transmitted to the optical transceiver body 10 via both MPOs 210 and 70 and is input to the external light modulator 25. The external light modulator 25 loads data into the input light source 440 using a signal processing element 60 and a driving element 30 and outputs a modulated optical signal 26, and the output data modulated optical signal 26 is transmitted through the MPOs 70 and 210 again via the detachable light source supply apparatus 100 and to the optical network through an output terminal MPO 310. Meanwhile, when an optical signal 27 is received from the optical network, the received optical signal 27 directly passes through the detachable light source supply apparatus 100, is transmitted to a light receiving element 40 of the optical transceiver body 10, and is processed by a light signal amplifying element 50 and the signal processing element 60.

Figure 6:
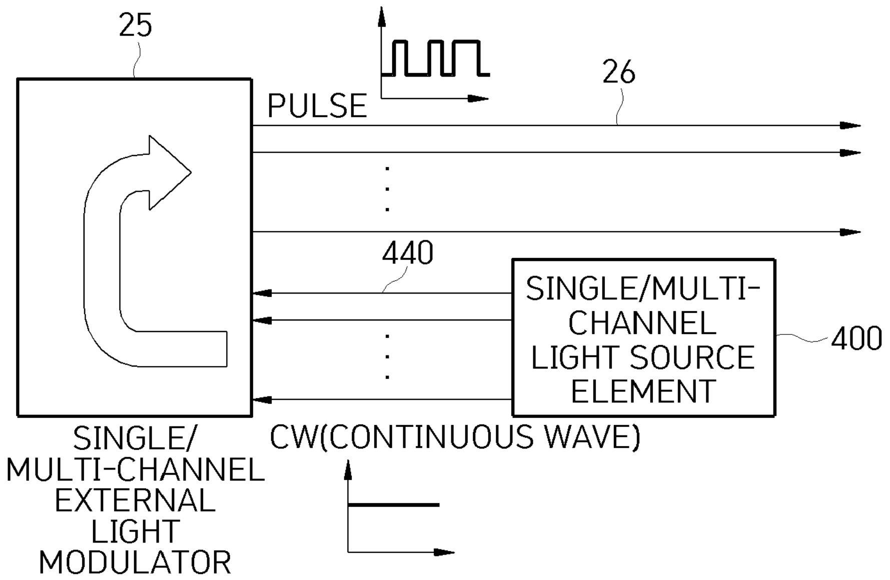
FIG. 6 is a diagram illustrating driving of a single/multi-channel external light modulator.

As illustrated in FIG. 6, the single/multi-channel external light modulator 25 disposed in the optical transceiver body 10 receives input of the light source 440 in the form of a continuous wave (CW) from the single/multi-channel light source element 400 and outputs the modulated optical signal 26 in the form of a pulse. In this case, the modulated optical signal 26 is a signal obtained by modulating the light source 440 into which the data is loaded by the signal processing element 60 and the driving element 30.

As mentioned above, various wavelength standards are applied to the optical network. The wavelength standards are determined by a light source, and thus, when the method of the present disclosure is applied, an electronic processing element including the signal processing element 60 and the light receiving element 40 may be equally applied to various wavelength standards. Thus, only the light source supply apparatus 100 needs to be separated and replaced according to the wavelength standard to be applied. Further, even when the light source element 400, which generally breaks down more frequently than other elements, breaks down, only the corresponding light source element 400 needs to be replaced advantageously. Further, even when the optical transceiver body 10 is replaced due to expansion of a transmission capacity or the like, the existing light source supply apparatus 100 may be separated and reused, and thus costs can be reduced.

Figure 7:
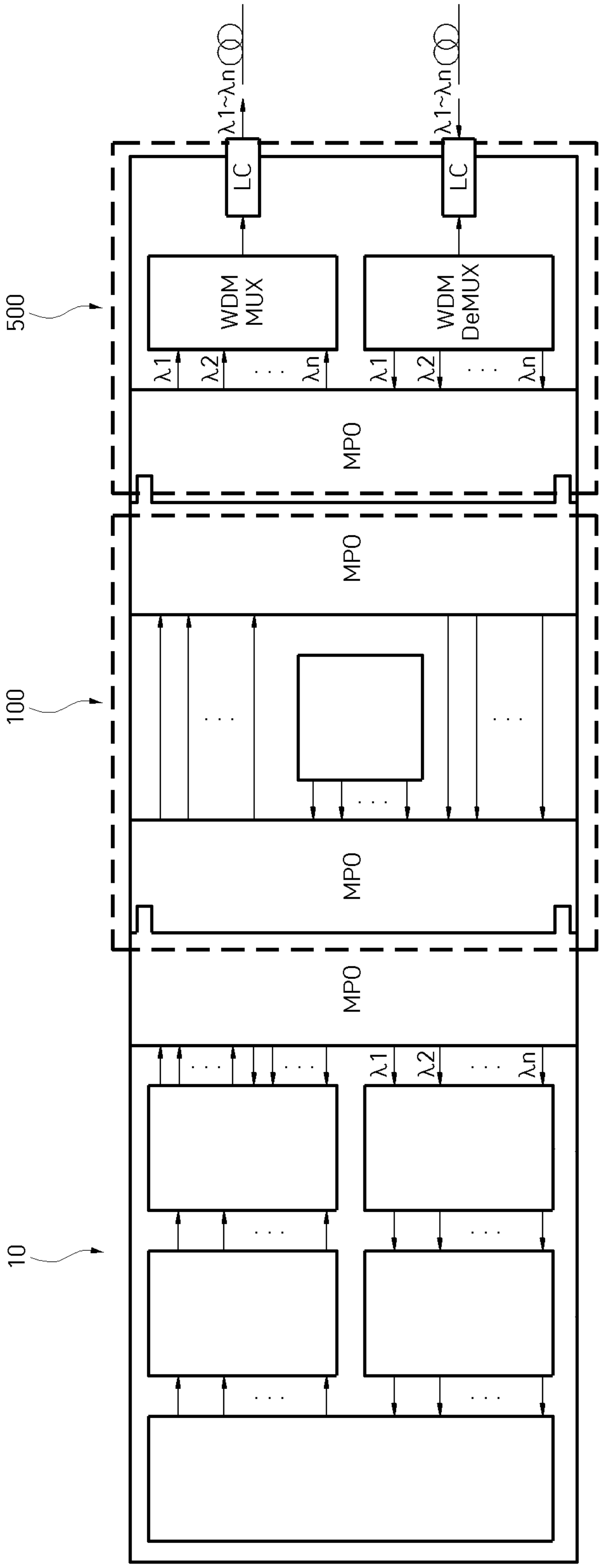
FIG. 7 is a diagram of an optical transceiver to which the detachable light source supply apparatus and a detachable wavelength multiplexing adapter are applied.

As illustrated in FIG. 7, the light source supply apparatus 100 of the present disclosure may be formed together with a detachable wavelength multiplexing adapter 500 for which the present inventor has previously filed an application in South Korea (application number: 10-2022-0003570, "Detachable wavelength multiplexing adapter detachably attached to a multi-channel optical transceiver and a multi-channel optical transmission device using the same").

If the detachable wavelength multiplexing adapter 500 is also used, both a parallel single mode (PSM) structure and a wavelength division multiplexing (WDM) structure may be applied, which is advantageous for product management of a manufacturer and maintenance/repair of a system company.

Figure 8:
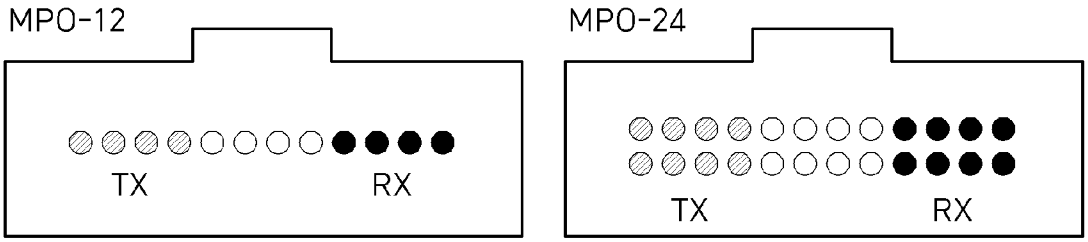
FIG. 8 is a conceptual view of an MPO optical interface MPO-12 of a four-channel optical transceiver (left side) and a conceptual view of an MPO optical interface MPO-24 of an eight-channel optical transceiver (right side)

The optical transceivers currently used most frequently in data centers are four-channel and eight-channel optical transceivers, and an MPO interface mainly used in the four-channel and eight-channel PSM optical transceivers is illustrated in FIG. 8. As can be identified in the left drawing, the four-channel PSM optical transceiver uses MPO-12 in which four lower channels and four upper channels are used for transmission TX and reception RX, respectively, and four middle channels are not used and left empty. In the case of the eight-channel PSM optical transceiver illustrated on the right side, an MPO-24 type having a two-line structure is mainly used as an optical interface. Like the four-channel PSM optical transceiver, eight left channels and eight right channels are used for the TX and the RX, respectively, and eight middle channels are not used and left empty.

Figure 9:
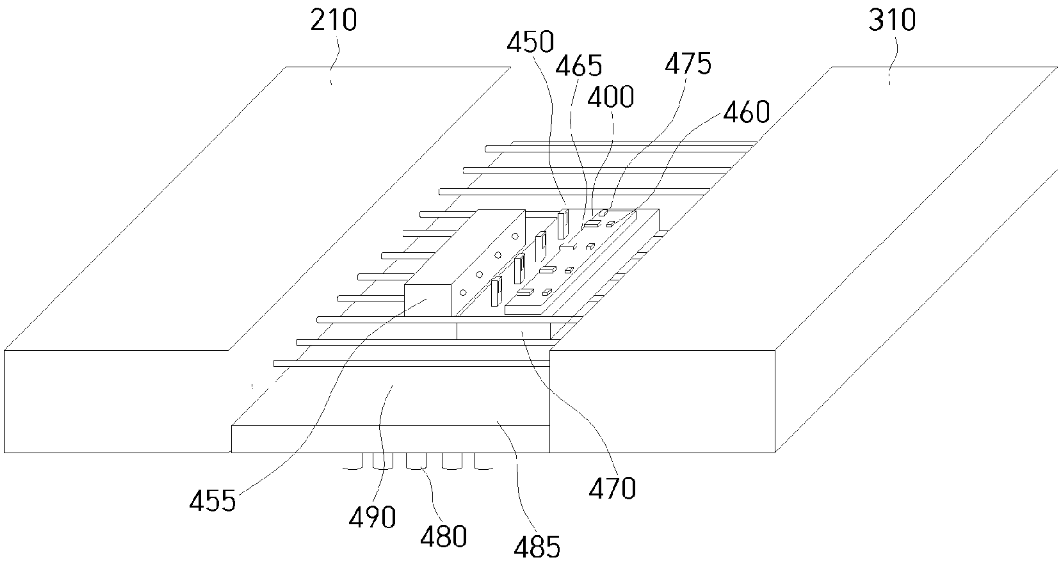
FIG. 9 is an exemplary diagram of an internal configuration of the detachable light source supply apparatus applied to the four-channel optical transceiver.
Figure 10:
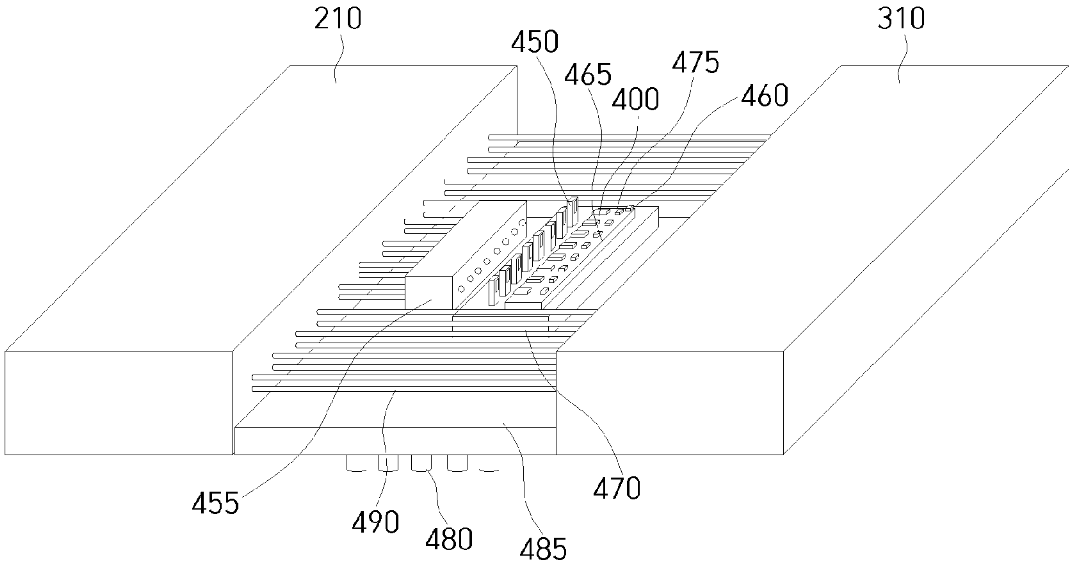
FIG. 10 is an exemplary diagram of an internal configuration of the detachable light source supply apparatus applied to the eight-channel optical transceiver.

FIG. 9 is an exemplary diagram of a configuration of the detachable light source supply apparatus used in the four-channel optical transceiver, and FIG. 10 is an exemplary diagram of a configuration of the detachable light source supply apparatus used in the eight-channel optical transceiver.

These configurations correspond to examples in which the four-channel/eight-channel light source element 400 that is one of the channels most frequently used in data centers is used. A wavelength of the four-channel/eight-channel light source element 400 may be used according to the wavelength standard applied to the optical transceiver, such as PSM, LWDM, or CWDM.

First, referring to FIG. 9, the light source emitted from the light source element 400 may be input to a four-channel fiber array block (FAB) 455 through a lens 450 and may be transmitted to the optical transceiver body 10 (see FIG. 5) through the four unused middle channels of the MPO-12 210. A monitoring photodetector (PD) 460 may be used to identify whether the light source is output normally. A mount or sub-mount 465 on which the light source element 400 and the lens 450 are mounted may be made of a material that dissipates heat generated by the light source element 400 and related electronic elements as much as possible. Further, when the WDM standard is applied, a thermoelectric cooling element TEC or a heat dissipation mount block 470 may be used to stabilize the wavelength. Power for elements such as the light source element 400, the monitoring PD 460, the thermoelectric cooling element TEC, and a thermistor 475 for a temperature sensor is supplied through a power supply pin 480 disposed outside the device. Reference numeral 485 that is not described in FIG. 9 denotes a substrate on which the sub-mount 465 for a light source element and the lens 450 are arranged. Reference numeral 490 that is not described in FIG. 9 denotes an optical fiber waveguide.

Next, referring to FIG. 10, the light source emitted from the light source element 400 may be input to an eight-channel FAB 455 through the lens 450 and may be transmitted to the optical transceiver body 10 (see FIG. 5) through the eight unused middle channels of the MPO-24 210. Descriptions of the monitoring PD 460, the sub-mount 465, the thermoelectric cooling element TEC or the heat dissipation mount block 470, the thermistor 475, the power supply pin 480, the substrate 485, and the optical fiber waveguide 490 are the same as those of the four-channel optical transceiver of FIG. 9.

The exemplary configuration illustrated in FIGS. 9 and 10 may be modified into various forms according to other application standards and structures. As mentioned above, if the optical transceiver is used according to the PSM standard, the detachable light source supply apparatus needs to be attached to the body (see FIG. 5), or if the optical transceiver is used according to the WDM standard, the detachable light source supply apparatus is attached to the optical transceiver body and then the detachable wavelength multiplexing adapter 500 is to be attached to the optical input/output unit 300 (see FIG. 7).

According to the present disclosure, since the detachable light source supply apparatus that is detachably attached to the outside of the optical transceiver body is used, even if the light source is damaged, it alone may be easily replaced without replacing other components. Further, since the optical transceiver body may be used identically regardless of the wavelength standard, product items of the optical transceiver may be simplified, the burden of securing inventory may be reduced, and thus management costs such as maintenance/repair may be reduced. Further, even when the optical transceiver is replaced to increase the transmission capacity, the light source supply apparatus may be reused, and thus costs may be reduced.

According to a detachable light source supply apparatus and a multi-channel optical transceiver employing the same according to the present disclosure, the light source supply apparatus may be detachably attached to the outside of the optical transceiver. So, even if a light source breaks down, a light source element alone may be easily replaced without replacing other components or an optical transceiver itself. Further, since the same optical transceiver body may be commonly used regardless of wavelength standards, product items of the optical transceiver may be simplified, the burden of securing inventory may be reduced, and accordingly, management costs such as maintenance/repair may be reduced. In addition, even if the optical transceiver is replaced to increase a transmission capacity, the light source supply apparatus may be reused, thereby reducing additional costs.

The present disclosure may be formed together with a detachable wavelength multiplexing adapter for which the present inventor has previously filed an application in South Korea (application number: 10-2022-0003570, title: Detachable wavelength multiplexing adapter detachably attached to a multi-channel optical transceiver and a multi-channel optical transmission device using the same). Thus the present disclosure may be applied even to a wavelength division multiplexing (WDM) structure such as a coarse wavelength division multiplexing (CWDM) structure or local area network WDM (LWDM) as well as the basically applicable parallel single mode fiber (PSM) structure.

Hereinabove, an embodiment in which the spirit of the present disclosure is implemented in detail has been described. However, the technical scope of the present disclosure is not limited to the embodiments and drawings described above, but is determined by reasonable interpretation of the appended claims.

What is claimed is:

1. A detachable light source supply apparatus configured to supply a light source to an optical transceiver body and comprising:

an optical transceiver coupling part detachably attached to the optical transceiver body;

an optical input/output unit configured to receive and transmit an optical signal; and a light source element configured to supply a light source to the optical transceiver body through the optical transceiver coupling part, wherein the detachable light source supply apparatus is configured as a standalone module that is physically attachable to and detachable from the optical transceiver body.

2. The detachable light source supply apparatus of claim 1, wherein the optical transceiver coupling part includes an input/output terminal connected to the optical transceiver body.

3. The detachable light source supply apparatus of claim 2, wherein the input/output terminal is one of a multi-channel input/output terminal and a single-channel input/output terminal.

4. The detachable light source supply apparatus of claim 1, wherein the optical input/output unit includes an input/output terminal to which an optical fiber is connected.

5. The detachable light source supply apparatus of claim 4, wherein the input/output terminal is one of a multi-channel input/output terminal and a single-channel input/output terminal.

6. The detachable light source supply apparatus of claim 1, wherein the light source element is configured to supply a light source in the form of a continuous wave (CW) to the optical transceiver body.

7. The detachable light source supply apparatus of claim 1, wherein the light source element includes a plurality of single-wavelength light emitters and is configured to supply a multi-channel light source to the optical transceiver body.

8. The detachable light source supply apparatus of claim 1, wherein the light source element is configured to supply a multi-channel light source to the optical transceiver body using a single light emitter and an optical splitter, wherein the optical splitter is configured to divide an optical output of the single light emitter having a same wavelength into a plurality of channels.

9. The detachable light source supply apparatus of claim 1, wherein the light source element is configured to supply a multi-channel light source to the optical transceiver body using a multi-channel light emitter configured to emit light sources having different wavelengths.

10. The detachable light source supply apparatus of claim 1, wherein the light source element is configured to supply a single-channel light source to the optical transceiver body using a single light emitter.

* * * * *